(12) United States Patent
Morimoto et al.

(10) Patent No.: US 6,807,544 B1
(45) Date of Patent: Oct. 19, 2004

(54) METHOD AND SYSTEM FOR INFORMATION RETRIEVAL BASED ON PARTS OF SPEECH CONDITIONS

(75) Inventors: Yukiko Morimoto, Kawasaki (JP); Hisao Mase, Machida (JP); Hirotaka Mizuno, Sagamihara (JP); Kazuhisa Kinugawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 184 days.

(21) Appl. No.: 09/635,261

(22) Filed: Aug. 9, 2000

(30) Foreign Application Priority Data

Aug. 11, 1999 (JP) .......................................... 11-227658

(51) Int. Cl.⁷ .............................................. G06F 17/30
(52) U.S. Cl. ............................ 707/100; 707/5; 704/9
(58) Field of Search ................................ 707/1–6, 100; 704/9

(56) References Cited

U.S. PATENT DOCUMENTS

| | | | | |
|---|---|---|---|---|
| 5,581,664 A | * | 12/1996 | Allen et al. .................. 706/11 |
| 5,619,694 A | * | 4/1997 | Shimazu ..................... 706/50 |
| 5,778,382 A | * | 7/1998 | Hatori .......................... 707/1 |
| 5,893,093 A | * | 4/1999 | Wills ........................... 705/22 |
| 5,933,822 A | * | 8/1999 | Braden-Harder et al. ...... 707/5 |
| 5,966,686 A | * | 10/1999 | Heidorn et al. ............... 704/9 |
| 6,041,323 A | * | 3/2000 | Kubota ......................... 707/3 |
| 6,236,987 B1 | * | 5/2001 | Horowitz et al. ............ 705/35 |
| 6,243,670 B1 | * | 6/2001 | Bessho et al. ................ 704/9 |
| 6,292,794 B1 | * | 9/2001 | Cecchini et al. .............. 707/3 |
| 6,532,444 B1 | * | 3/2003 | Weber ....................... 704/257 |

* cited by examiner

*Primary Examiner*—Greta Robinson
*Assistant Examiner*—Debbie M. Le
(74) *Attorney, Agent, or Firm*—Antonelli, Terry, Stout & Kraus, LLP

(57) ABSTRACT

An information retrieval navigation method permitting either the operator or the customer not equipped with a sufficient knowledge of a given product to obtain a sufficient retrieval result is disclosed, in which at least a retrieval navigation item is generated based on the information on a plurality of cases about the product, the user is caused to select at least selected one of the retrieval navigation items, and a retrieval navigation message constituting a natural language message is generated and output from the selected retrieval navigation item. As a result, even the operator or the customer not fully equipped with the knowledge of the product can obtain a sufficient retrieval result.

13 Claims, 20 Drawing Sheets

GUIDANCE ITEM GENERATION CONDITION FILE
204                                                                 204a

| RANK | EXTRACTED DATA | EXTRACTED DATA CONDITION | | |
|---|---|---|---|---|
| FIRST RANK | VERB | | | |
| SECOND RANK | NOUN | NOUN INVOLVED | PARTICLE | FIRST RANK VERB |
| SECOND RANK | NOUN | FIRST RANK VERB | PARTICLE | NOUN INVOLVED |
| THIRD RANK | NOUN | SECOND RANK NOUN | PARTICLE | NOUN INVOLVED |
| THIRD RANK | NOUN | NOUN INVOLVED | PARTICLE | SECOND RANK NOUN |
| FOURTH RANK | NOUN | | | |

CASE DATA BASE
201

| | |
|---|---|
| CASE ID: 00001 | — 201b1 |
| RECEIVING DATE: APRIL 17, 1996 | — 201b2 |
| COUNTER STAFF: HANAKO HITACHI | — 201b3 |
| USER: ABC STAFF SUPPLY COMPANY | — 201b4 |
| PRODUCT NAME: PAYROLL CALCULATION SPREADSHEET SOFTWAR | — 201b5 |
| INQUIRY: NEW ITEMS DESIRED IN PAYROLL SLIP CANNOT BE GENERATED | — 201b6 |
| CAUSE: PAYROLL SLIP FORMAT IS LOCKED | — 201b7 |
| DEALING METHOD: "NEW ITEM GENERATION" IS IN GRAY CHARACTERS AN CAN NOT SELECTED FROM "FORMAT" OF MENU THEN, ITEM "LOCK" WAS CHECKED FROM "TOOL" OF MENU, FINDING THAT SPREADSHEET ITEM WAS LOCKED AND COULD BE CHANGED. IT BECAME POSSIBLE TO ADD NEW ITEM BY UNLOCKING. | — 201b8 |
| MISCELLANEOUS: NIL | — 201b9 |

RETRIEVAL RESULT DATA BASE 202

| | |
|---|---|
| CASE ID: 00203 | 202b1 |
| RECEIVING DATE: JUNE 11, 1997 | 202b2 |
| COUNTER STAFF | 202b3 |
| USER: ABC BANK | 202b4 |
| PRODUCT NAME: SPREADSHEET CALCULATION SOFTWARE | 202b5 |
| INQUIRY: PREPARED SPREADSHEET DESIRED TO BE PRINTED IN A SINGLE SHEET OF PAPER CLEARLY | 202b6 |
| CAUSE: PAGE SETTING METHOD | 202b7 |
| DEALING METHOD: SELECT "PAGE SETTING" FROM "FILE" IN MENU AND PRINT AFTER SELECTING "PRINT IN SINGLE SHEET IN BOTH DIRECTIONS" FROM THE ITEM OF "SCALE UP/DOWN PRINTING" | 202b8 |
| MISCELLANEOUS: NIL | |
| DEGREE OF ANALOGY: 85 MARKS | 202b9 |

(202a denotes the overall record)

FIG. 8

WORD FILE
203                                         203a

| CASE ID | WORD | PART OF SPEECH | |
|---|---|---|---|
| : | : | : | : |
| 00203 | SELECT | VERB | |
| 00203 | "PAGE SETTING" | NOUN | MENU LIST |
| 00203 | FROM | PARTICLE | |
| 00203 | "FILE" | NOUN | MENU LIST |
| 00203 | IN | PARTICLE | |
| 00203 | MENU | NOUN | |
| 00203 | AND | PARTICLE | |
| 00203 | PRINT | VERB | |
| 00203 | AFTER | PARTICLE | |
| 00203 | SELECTING | VERB | |
| 00203 | "PRINT IN SINGLE SHEET IN BOTH DIRECTIONS" | NOUN | MENU LIST |
| 00203 | FROM | PARTICLE | |
| 00203 | THE | PARTICLE | |
| 00203 | ITEM | NOUN | |
| 00203 | OF | PARTICLE | |
| 00203 | "SCALE UP/DOWN PRINTING" | NOUN | MENU LIST |
| : | : | : | |

GUIDANCE ITEM GENERATION CONDITION FILE
204

| RANK | EXTRACTED DATA | EXTRACTED DATA CONDITION | | | | | |
|---|---|---|---|---|---|---|---|
| FIRST RANK | VERB | | | | | | FIRST RANK VERB |
| SECOND RANK | NOUN | NOUN INVOLVED | PARTICLE | FIRST RANK VERB | | | NOUN INVOLVED |
| SECOND RANK | NOUN | FIRST RANK VERB | PARTICLE | NOUN INVOLVED | | | NOUN INVOLVED |
| THIRD RANK | NOUN | SECOND RANK NOUN | PARTICLE | NOUN INVOLVED | | | SECOND RANK NOUN |
| THIRD RANK | NOUN | NOUN INVOLVED | PARTICLE | SECOND RANK NOUN | | | |
| FOURTH RANK | NOUN | | | | | | |

FIG. 10

GUIDANCE ITEM PROGRESS FILE NO. 1
2041

| CASE ID | GUIDANCE ITEM | PART OF SPEECH | SCORE | RANK | HIGH RANK KEYWORD |
|---|---|---|---|---|---|
| : | : | : | : | : | : |
| 00203 | SELECT | VERB | 3 | 1 | |
| 00203 | SELECT | VERB | 2 | 1 | |
| 00203 | PRINT | VERB | 1 | 1 | |
| 00203 | "PAGE SETTING" | NOUN | 1 | 2 | SELECT |
| 00203 | "SINGLE SHEET IN BOTH DIRECTIONS" | NOUN | 1 | 2 | SELECT |
| 00203 | "FILE" | NOUN | 1 | 3 | "PAGE SETTING" |
| 00203 | ITEM | NOUN | 1 | 3 | "SINGLE SHEET IN BOTH DIRECTIONS" |
| 00203 | MENU | NOUN | 1 | 4 | "FILE" |
| 00203 | "SCALE UP/DOWN PRINTING" | NOUN | 1 | 4 | ITEM |
| : | : | : | : | : | : |

GUIDANCE ITEM PROGRESS FILE NO. 2
2042

| GUIDANCE ITEM | PART OF SPEECH | SCORE | RANK | HIGH RANK KEYWORD |
|---|---|---|---|---|
| .. | .. | .. | .. | .. |
| SELECT | VERB | 5 | 1 | |
| PRINT | VERB | 1 | 1 | |
| "PAGE SETTING" | NOUN | 1 | 2 | SELECT |
| "SINGLE SHEET IN BOTH DIRECTIONS" | NOUN | 1 | 2 | SELECT |
| "FILE" | NOUN | 1 | 3 | "PAGE SETTING" |
| ITEM | NOUN | 1 | 3 | "SINGLE SHEET IN BOTH DIRECTIONS" |
| MENU | NOUN | 1 | 4 | "FILE" |
| "SCALE UP/DOWN PRINTING" | NOUN | 1 | 4 | ITEM |
| .. | | | .. | .. |

FIG. 12
GUIDANCE ITEM FILE 205

| RANK | GUIDANCE ITEM | HIGH RANK DATA | SCORE |
|---|---|---|---|
| FIRST RANK | PULL AND PUSH | NIL | 15 |
| SECOND RANK | PRINTER CABLE | PULL AND PUSH | 5 |
| THIRD RANK | REPEAT | PRINTER CABLE | 1 |
| FIRST RANK | CHECK | NIL | 12 |
| SECOND RANK | PAGE SETTING | CHECK | 4 |
| THIRD RANK | PAPER TRAY | PAGE SETTING | 2 |
| THIRD RANK | A4 | PAGE SETTING | 1 |
| THIRD RANK | AUTOMATIC SELECTION | PAGE SETTING | 1 |
| FIRST RANK | SELECT | NIL | 9 |
| SECOND RANK | SPREADSHEET | SELECT | 3 |
| THIRD RANK | MENU BAR | SPREADSHEET | 2 |
| THIRD RANK | GRAPH | SPREADSHEET | 1 |
| ⋮ | ⋮ | ⋮ | ⋮ |

FIG. 13

NAVIGATION MESSAGE
GENERATION CONDITION FILE
206                                                                    206a

| SELECTED GUIDANCE ITEM | KEYWORD USED | NAVIGATION MESSAGE GENERATION METHOD |
|---|---|---|
| FIRST RANK | FIRST RANK | \<VERB\> |
| FIRST AND SECOND RANKS | FIRST AND SECOND RANKS | \<VERB\> \<PARTICLE\> \<NOUN\> |
| SECOND RANK | FIRST AND SECOND RANKS | \<VERB\> \<PARTICLE\> \<NOUN\> |
| THIRD RANK | FIRST, SECOND AND THIRD RANKS | \<VERB\> \<PARTICLE\> \< NOUN (2)\>\<PARTICLE\>\<NOUN (3)\> |
| SECOND AND THIRD RANKS | FIRST, SECOND AND THIRD RANKS | \<VERB\> \<PARTICLE\> \< NOUN (2)\> \<PARTICLE\> \< NOUN(3)\> |
| FIRST, SECOND AND THIRD RANKS | FIRST, SECOND AND THIRD RANKS | \<VERB\> \<PARTICLE\> \< NOUN (2)\> \<PARTICLE\> \< NOUN(3)\> |
| : | : | : |

206b1     206b2     206b3

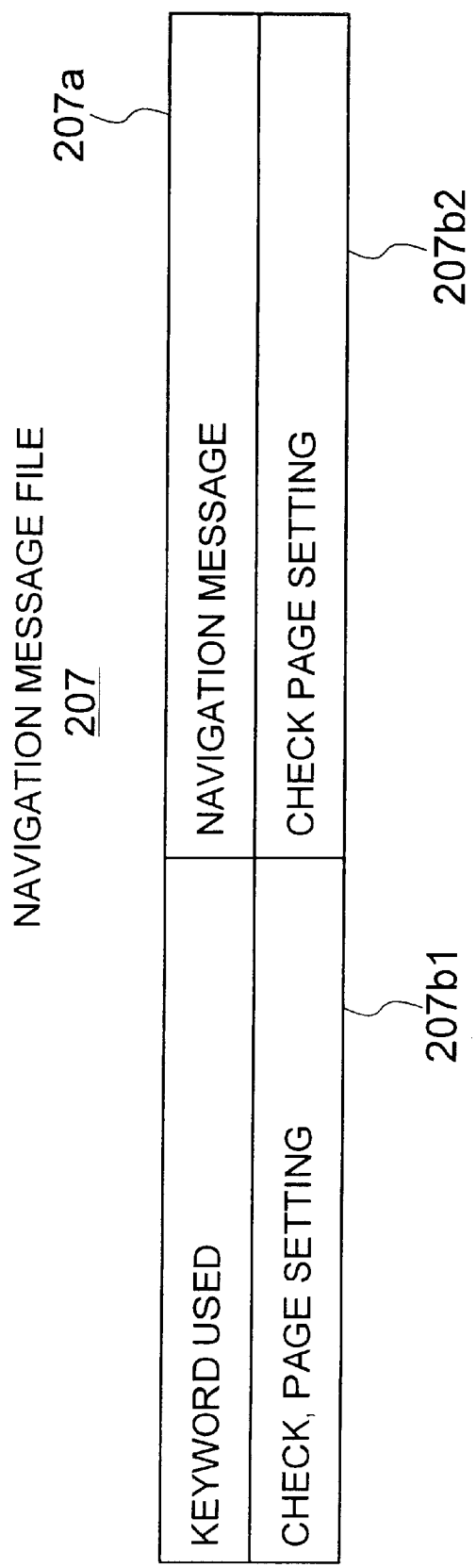

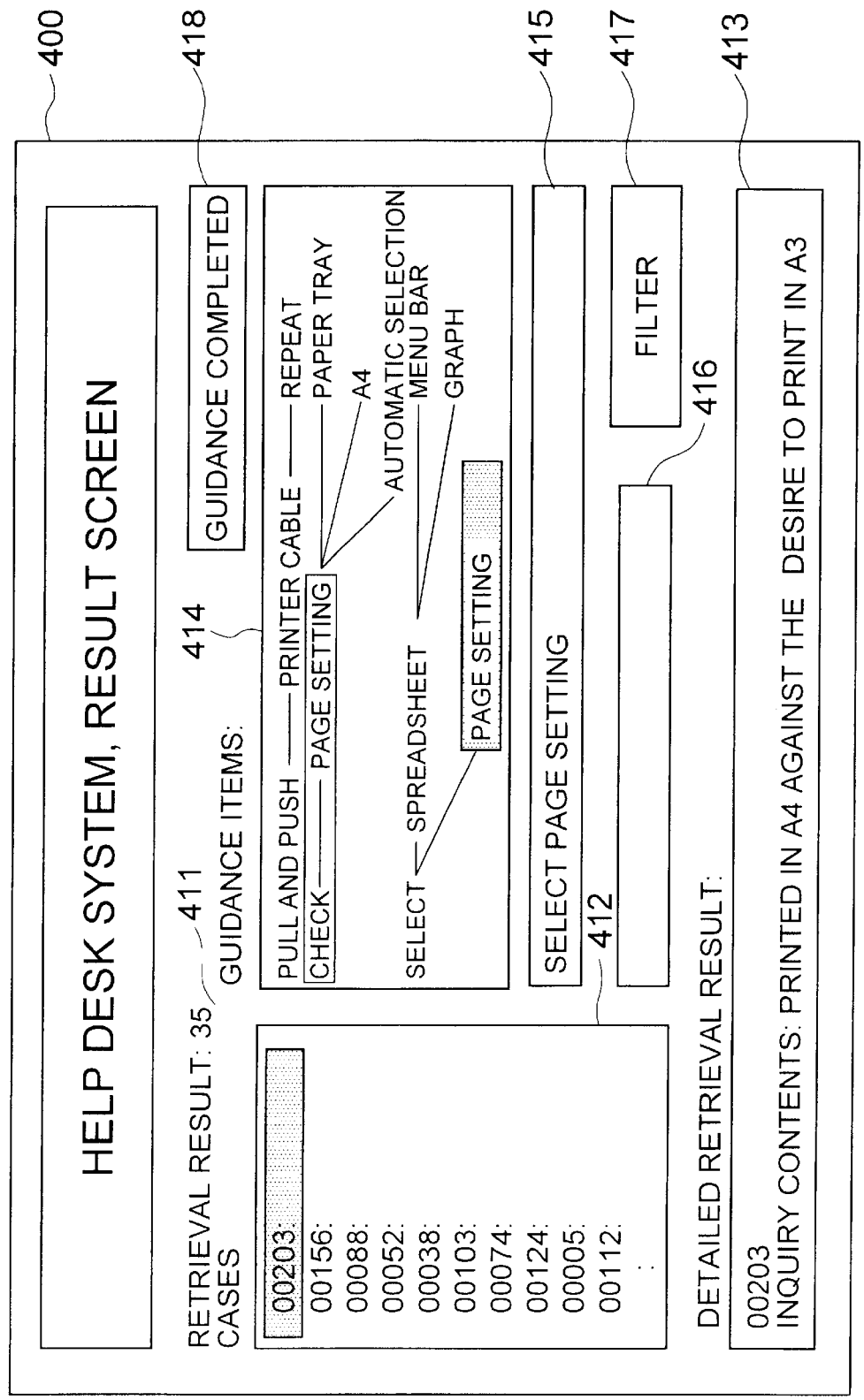

US 6,807,544 B1

METHOD AND SYSTEM FOR INFORMATION RETRIEVAL BASED ON PARTS OF SPEECH CONDITIONS

BACKGROUND OF THE INVENTION

The present invention relates to a method for navigating information retrieval, or more in particular to a method for supporting the information retrieval in such a manner as to secure a satisfactory result of retrieval even for an operator or a customer having an insufficient knowledge of a product.

Products having various functions are widely used through the world, and each maker, with the intention of leading the other makes, are equipped with a help desk system for meeting inquiries and claims about their products as a part of the customer services.

FIG. 1 is a schematic image diagram showing the conventional help desk system.

The customer makes "a telephone inquiry" for any problem he may have about a product that he has intended to use.

The help desk operator, upon receipt of the inquiry from the customer, searches a data base storing past cases and problems and dealing methods using such retrieval means as full-text retrieval, keyword retrieval or similarity-based retrieval, and in the case where there exists a similar inquiry, informs the customer of a dealing method for the particular inquiry as an "answer". In the case where the retrieval by the operator fails to solve the problem, on the other hand, the operator makes an inquiry at a specialty department for the particular product, and the particular department gives an answer in place of or through the operator.

A help disk system with which the customer makes a direct retrieval without the intermediary of the operator is also extending. The customer checks for similar case documents of the past problems, if any, using the information retrieval system on the internet such as WWW (World Wide Web). In the case where the customer himself is unable to solve the problem, he makes an inquiry at a specialty department through electronic mail, telephone or the like.

The problem of the conventional help desk system is that, for lack of a sufficient knowledge of the product on the part of both the operator and the customer, the operator would fail to grasp the specifics of the problem from the customer on the one hand and the customer could not fully understand the problem on the other hand. Thus the case data base could not searched properly and therefore a sufficient result of retrieval has been unable to be achieved.

SUMMARY OF THE INVENTION

Accordingly, the object of the present invention is to provide a method for navigating information retrieval in which even an operator or a customer not equipped with a sufficient knowledge of a given product can obtain a sufficient result of retrieval.

According to a first aspect of the invention, there is provided a method for navigating information retrieval in which a navigation list is generated and output in accordance with a generation condition of the navigation list from the information on a plurality of cases to be retrieved.

In the method for navigating information retrieval according to the first aspect, a navigation list is generated and output based on the information about a plurality of cases for the product involved, and therefore even an operator or a customer not equipped with a sufficient knowledge of the product can obtain a sufficient retrieval result utilizing the particular navigation list.

According to a second aspect of the invention, there is provided a method for navigating information retrieval in which a navigation list is generated in accordance with the navigation list generation condition from the information on a plurality of cases for the product involved, the user is caused to select at least one of the retrieval navigation items included in the navigation list, and a sentence or a case including the selected retrieval navigation item is retrieved and output.

In the method for navigating information retrieval according to the second aspect described above, a navigation list is generated based on the information about a plurality of cases for the product involved and a sentence or a case including the retrieval navigation item selected from the navigation list is retrieved and output. Therefore, even the operator or the customer not equipped with a sufficient knowledge of the product can obtain a sufficient retrieval result by the simple operation of selection.

According to a third aspect of the invention, there is provided a method for navigating information retrieval, in which a retrieval navigation message is generated and output as a natural language message. Therefore, even the operator or the customer not equipped with a sufficient knowledge of a particular product can obtain a sufficient retrieval result by the simple operation of following the retrieval navigation message.

BRIEF DESCRIPTION OF THE DRAWINGS

FIG. 6 is a diagram showing the data structure of a case data base.

FIG. 7 is a diagram showing the data structure of a retrieval result data base.

FIG. 8 is a diagram showing the structure of a word file.

FIG. 9 is a diagram showing the structure of a diagnosis item generation condition file.

FIG. 10 is a diagram showing the structure of the diagnosis item progress file No. 1.

FIG. 11 is a diagram showing the structure of the diagnosis item progress file No. 2.

FIG. 12 is a diagram showing the structure of the diagnosis item file.

FIG. 13 is a diagram showing the structure of a generation condition file for navigation messages.

FIG. 14 is a diagram showing the structure of a navigation message file.

FIG. 20 is a diagram illustrating a third example screen of the information retrieval system.

DESCRIPTION OF THE EMBODIMENT

An embodiment of the present invention will be explained below with reference to the accompanying drawings. This invention, however, is not limited to the embodiment described below.

This embodiment refers to the case in which the operator searches a trouble shooting report.

The operation of the operator for acquiring the detailed situation from the customer is called the "diagnosis". The information required for acquisition expressed as a word(s) ("check", "page setting", etc.) is called the "diagnosis item" which is one of the retrieval navigation items. Also, a sentence composed of several related diagnosis items coupled to each other ("Check the page setting", for example) is called the "navigation message" which is one of the retrieval navigation messages.

Figure 1:
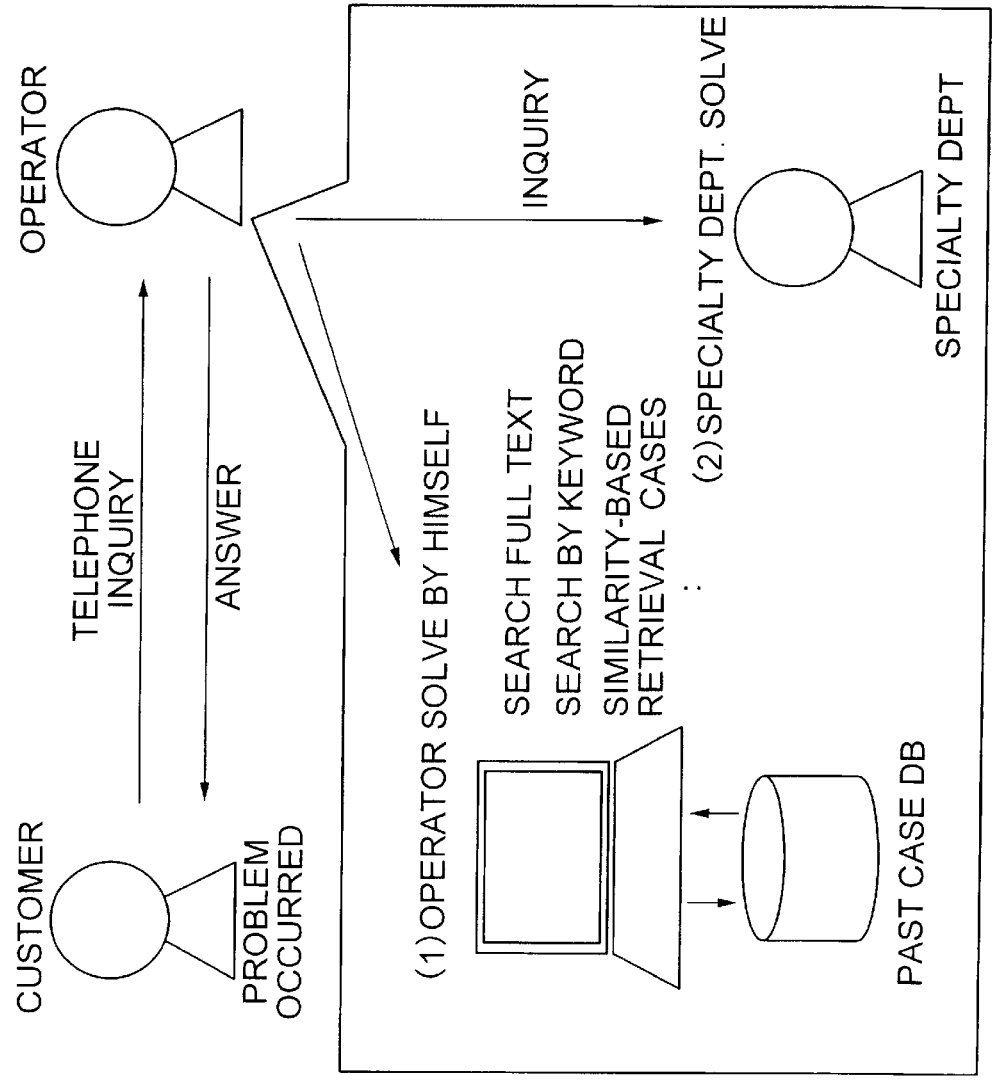
FIG. 1 is a diagram for explaining an outline of the conventional help desk system.
Figure 2:
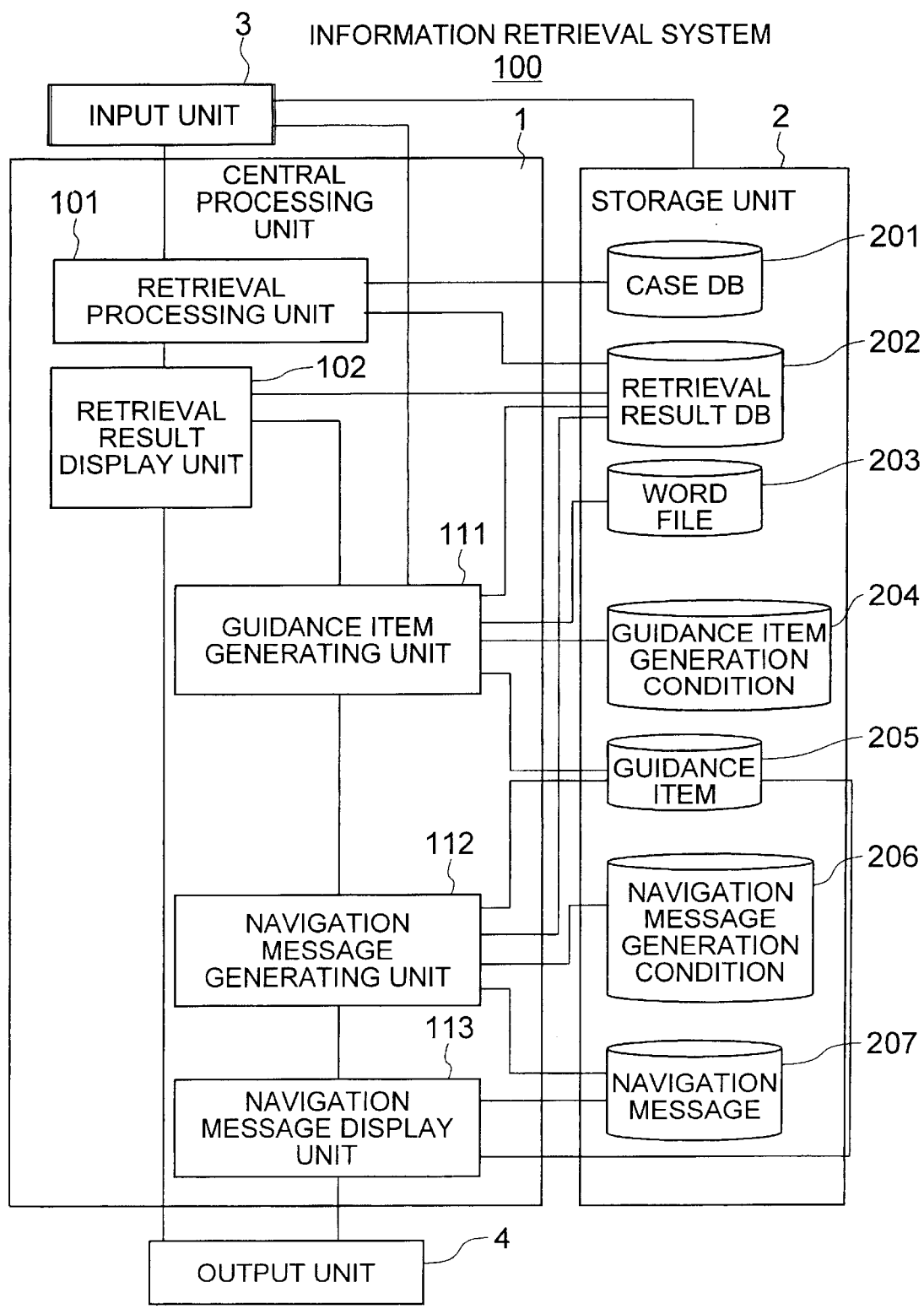
FIG. 2 is a diagram showing a general configuration of an information retrieval system.

FIG. 2 is a diagram showing a configuration of an information retrieval system according to an embodiment of the invention.

The information retrieval system 100 comprises a central processing unit 1, a storage unit 2, an input unit 3 and an output unit 4.

The central processing unit 1 has stored therein a processing program including a retrieval processing unit 101 for searching a past case data base 201 for a case meeting the retrieval conditions input by the operator through the input unit 3 and outputting the result of search to a retrieval result data base 202, a retrieval result display unit 102 for retrieving, processing and outputting the information to be displayed on the output screen of the output unit 4 from the retrieval result data base 202, a diagnosis item generating unit 111 for generating a diagnosis item with reference to the retrieval result data base 202, a word file 203 and a diagnosis item generation condition file 204 and outputting the diagnosis item to the diagnosis item file 205 whenever required, a navigation message generating unit 112 for generating a navigation message with reference to the diagnosis item file 205 and the navigation message generation condition file 206 and outputting the resulting navigation message to the navigation message file 207, and a navigation message display unit 113 for processing and outputting the diagnosis item and the navigation message thus generated in order to display them on the output screen of the output unit 4.

The storage unit 2 has stored therein the case data base 201, the retrieval result data base 202, the word file 203, the diagnosis item generation condition file 203, the diagnosis item file 205, the navigation message generation condition file 206 and the navigation message file 207.

Figure 3:
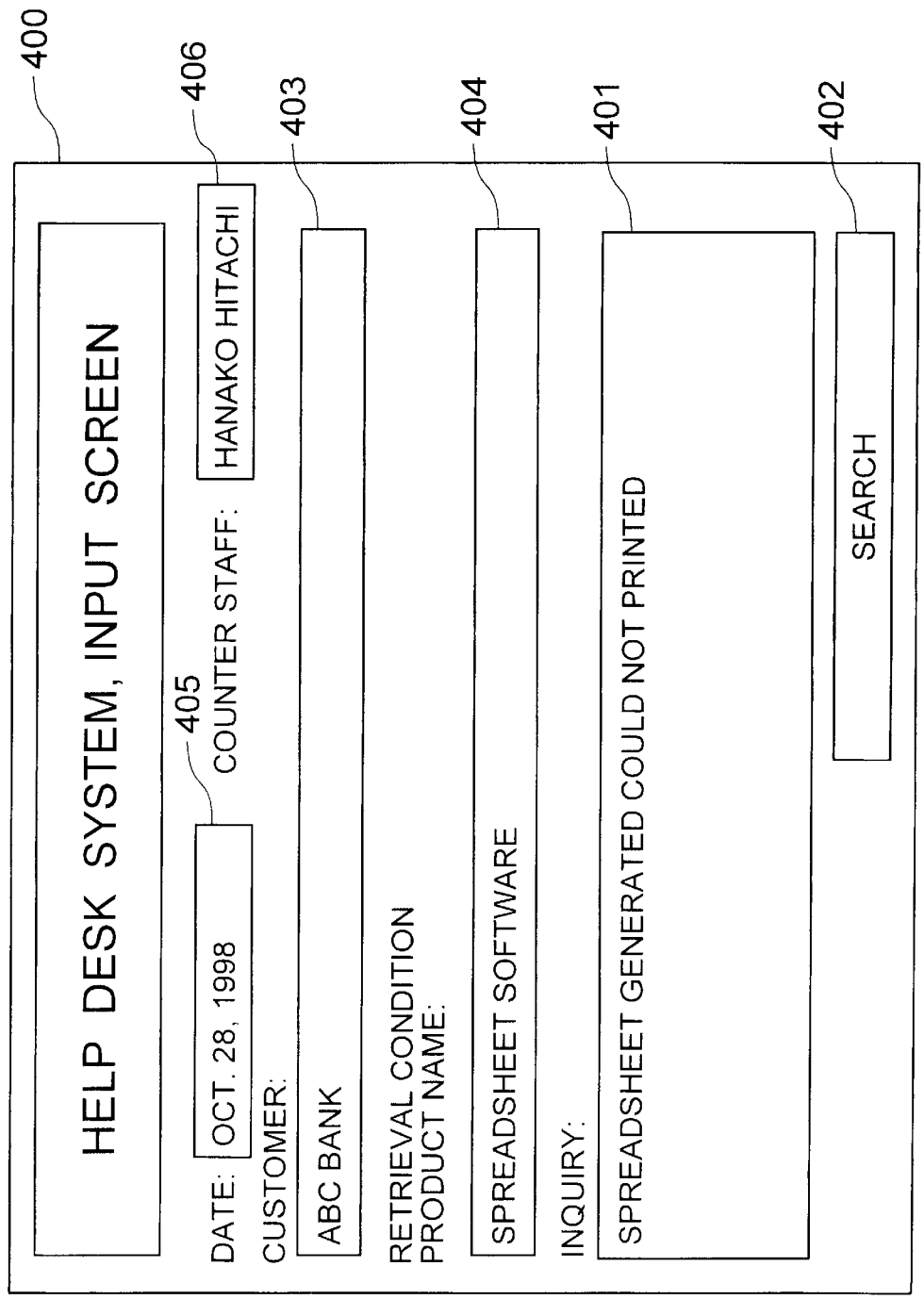
FIG. 3 is a diagram illustrating a first example screen of an information retrieval system.

FIG. 3 illustrates an input screen displayed on the output unit 4.

The display area 400 includes an area 401 for inputting the contents of the inquiry from the customer in a natural language message, a button 402 for instructing the retrieval to be started, an area 403 for inputting the name of the customer, an area 404 for inputting the name of the product used by the customer, an area 405 for inputting the date and time at which the inquiry is received from the customer, and an area 406 for inputting the name of the operator.

Figure 4:
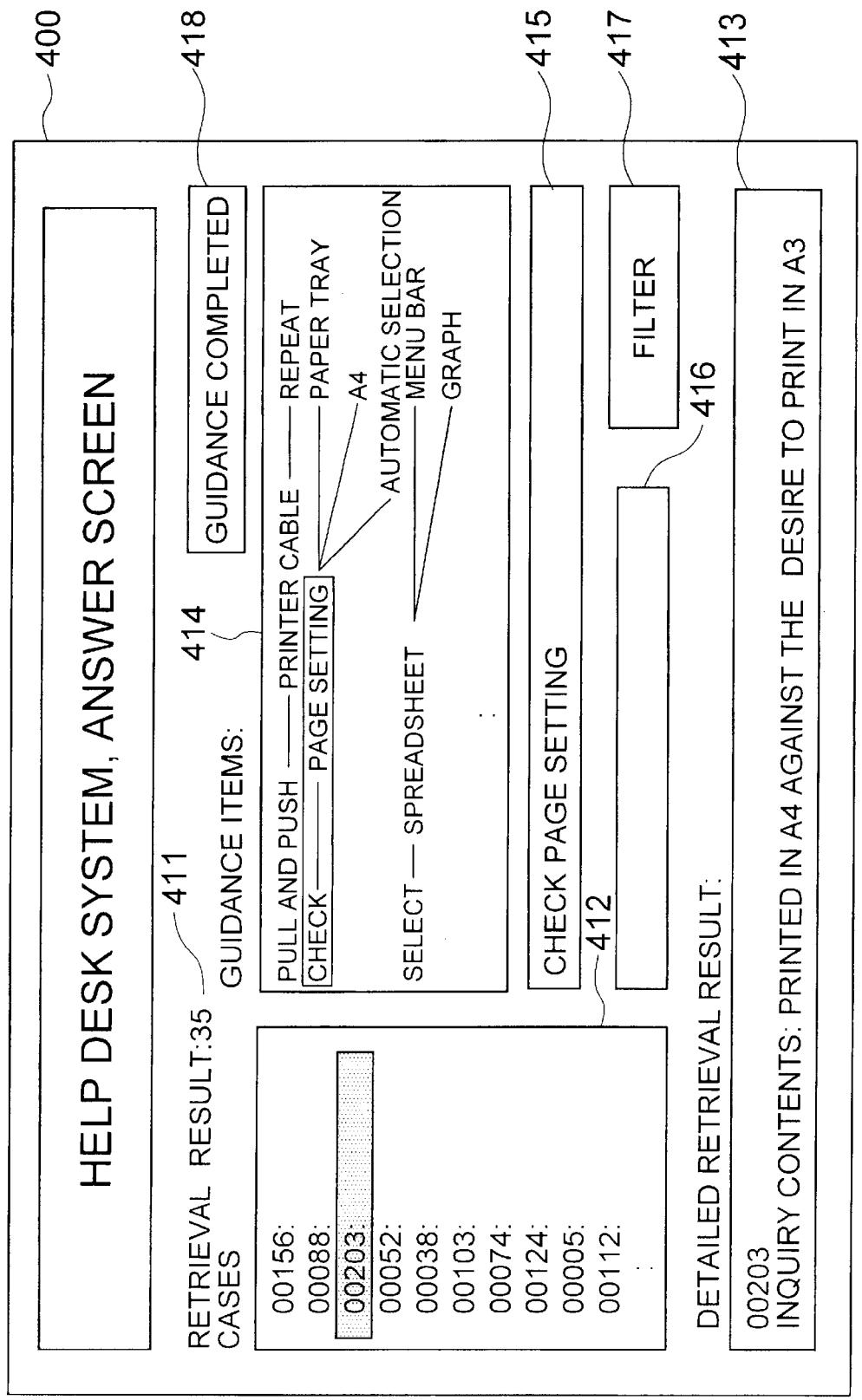
FIG. 4 is a diagram illustrating a second example screen of an information retrieval system.

FIG. 4 illustrates an output screen displayed on the output unit 4.

The display area 400 includes an area 411 for displaying the number of retrieval result cases, an area 412 for displaying a list of retrieval result cases, an area 413 for displaying detailed contents of a case selected from the retrieval result case list, an area 414 for displaying the hierarchical structure of diagnosis items, an area 415 for displaying a navigation message, an area 416 for inputting the condition for selecting the retrieval result, a button 417 for instructing to start the selection, and a button 418 for recording that the operator has used the selected diagnosis item for navigation.

Figure 5:
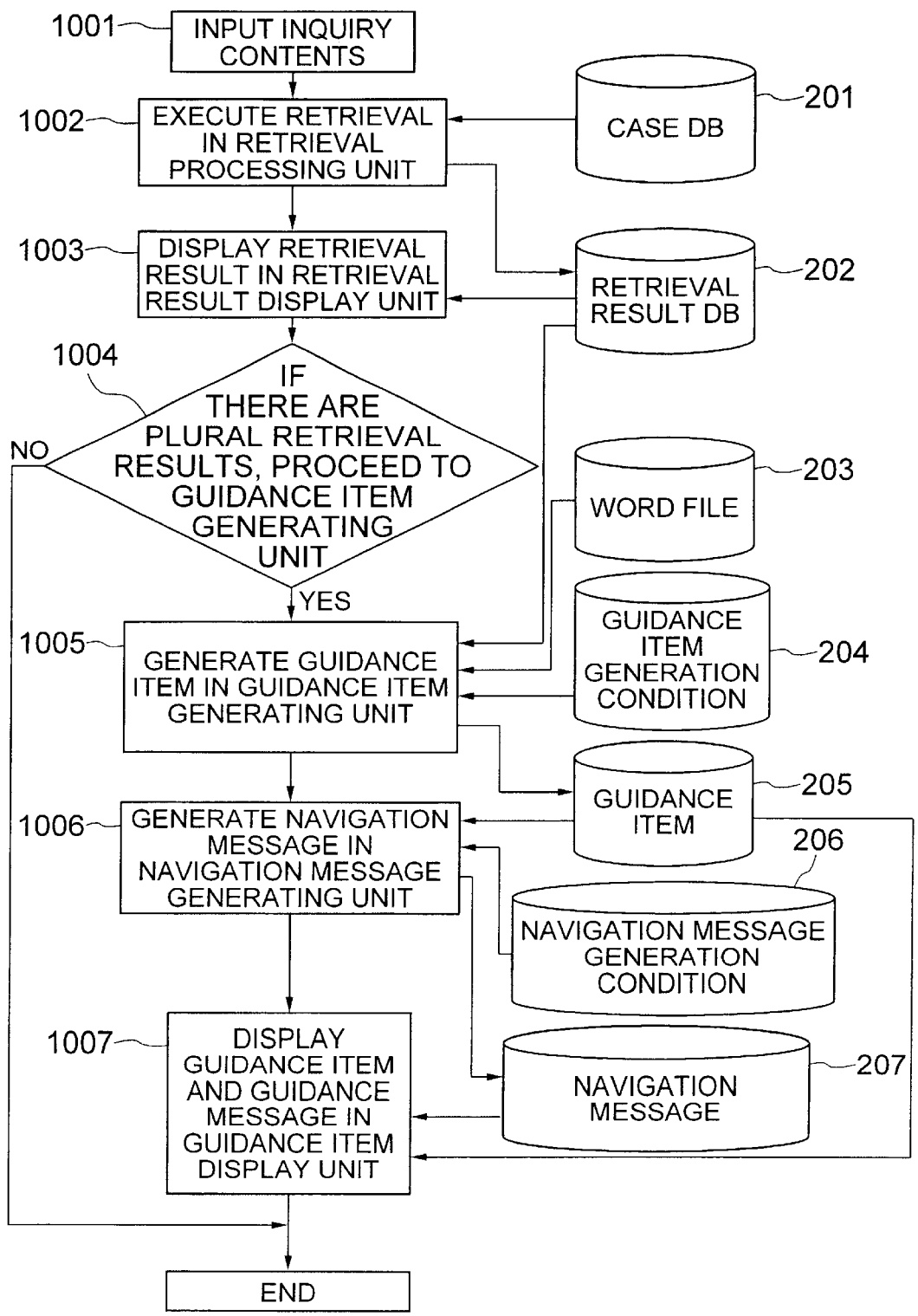
FIG. 5 is a flowchart showing the operation of an information retrieval system.

FIG. 5 is a flowchart showing the whole process executed by the information retrieval system 100.

First, the inquiry input by the operator through the input unit 3 is entered as a retrieval condition in the retrieval processing unit 101 (step 1001).

Then, in the retrieval processing unit 101, a case meeting the retrieval condition is retrieved from the case data base 201 based on the retrieval condition thus input and the retrieval result is output to the retrieval result data base 202 (step 1002).

In the retrieval result display unit 102, the information to be displayed in the display area 400 of the output unit 4 is extracted from the retrieval result data base 202 and output to the output unit 4 (step 1003).

In the case where there exist a plurality of cases included in the retrieval result data base 202, the process proceeds to the next step while in the absence of a plurality of cases, the process is terminated (step 1004).

In the diagnosis item generating unit 111, diagnosis items are generated with reference to the retrieval result data base 202, the word file 203 and the diagnosis item generation condition file 204 and output to the diagnosis item file 205 (step 1005).

In the navigation message generating unit 112, a navigation message is generated with reference to the diagnosis item file 205, the navigation message generation condition file 206 and output to the navigation message file 207 (step 1006).

Finally, in the diagnosis item display unit 113, the information to be displayed in the display area 400 of the output unit 4 is extracted from the diagnosis item file 205 and the navigation message file 207 and output to the output unit 4 (step 1007).

FIG. 6 is a diagram showing the data structure of the case data base 201.

The case data base 201 is configured with a plurality of files 201a. Each of the files 201a includes a plurality of records 201b1 to 201b9. Each of the records 201b1 to 201b9 includes the record name and the contents of the record.

The file 201a shown in FIG. 6, for example, is configured with nine records including "case ID", "date received", "counter staff", "customer name", "product name", "inquiry", "cause", "dealing method" and "miscellaneous".

The case data base 201 is the one prepared beforehand in principle, to which any inquiry, if any, from the customer can be added.

The record "inquiry" contains the description of the contents of the customer's problem, and the cause and the dealing method against the inquiry are described in the record entitled "cause" and the record entitled "dealing method", respectively.

According to this invention, the contents of the records "cause" and "dealing method" are given special consideration. Also, in view of the fact that "dealing method" is always accompanied by some action, the record "verb" is given special consideration among the contents of the record "dealing method". Further, "noun" constituting an object of action which is attached to the "verb" is considered. These parts of speech will be described later with reference to the diagram showing the structure of the diagnosis item generation condition file 204 and the navigation message generation condition file 206.

FIG. 7 is a diagram showing the structure of the retrieval result data base 202.

The retrieval result data base 202 includes a plurality of files 202a. Each file 202a includes a plurality of records 202b1 to 202b9. Each of the records 202b1 to 202b9 is configured with a record name and contents of the record.

The file 202a of FIG. 7, for example, is configured with ten records including "case ID", "date received", "counter staff", "customer name", "product name", "inquiry", "cause", "dealing method", "miscellaneous" and "degree of similarity".

The number of the files of the retrieval result data base 202 corresponds to the number of the retrieval result cases.

The record entitled "degree of similarity" indicating the degree to which the retrieval condition is met is expressed by an integer between 0 and 100 and calculated according to a well-known method.

FIG. 8 is a diagram showing the structure of the word file 203.

The word file 203 is configured with a plurality of records 203a. Each record 203a includes four data items 203b1 to 203b4, i.e. "case ID", "word", "part of speech" and "miscellaneous". The "word" is registered in the order of appearance in the cases. The word file 203 is generated as a process preceding to the generation of a diagnosis item in the diagnosis item generating unit 111.

FIG. 9 is a diagram showing the structure of the diagnosis item generation condition file 204.

The diagnosis item generation condition file 204 is configured with a plurality of records 204a. Each record 204a includes three data items 204b1 to 204b3, i.e. "rank", "extracted data" and "extracted data condition". The "extracted data condition" in turn includes a plurality of data items.

Consider the record 204a of the diagnosis item generation condition file 204, for example. The "extracted data" of the first rank is a "verb" and nothing is included in "extracted data condition". Also, the first "noun" in the "extracted data" for the "second rank" branching from the first rank in "rank" is "name involved" after which "particle" appears followed by "first rank verb". The second "noun" in "extracted data" for "second rank", on the other hand, is "noun involved" which appears after "particle" following "first rank verb".

This diagnosis item generation condition file 204 is basically the data prepared in advance, but may be changed or supplemented by the manager of the information retrieval system 100.

FIG. 10 is a diagram showing the structure of the diagnosis item progress file No. 1 generated during the generation of the diagnosis items.

The diagnosis item progress file No. 1 (2041) is configured with a plurality of records 2041a. Each record 2041a includes six data items 2041b1 to 2041b6, i.e. "case ID", "diagnosis item". "part of speech", "score", "rank" and "high rank keyword".

Consider the record 2041a of the diagnosis item progress file No. 1 (2041) of FIG. 10, for example. In progress, "00203" is extracted as "case ID", "select" as "diagnosis item", "verb" as "part of speech", and "3" as "score", "1" as "rank", and "Nil" as "high rank keyword". Also, "00203" is extracted as "case ID", "page setting"as "diagnosis item", "noun" as "part of speech", "1" as "score", "2" as "rank" and "select" as "high rank keyword" in progress.

This diagnosis item progress file No. 1 (2041) is a temporary file generated in the storage unit 2 by the diagnosis item generating unit 111, and deleted from the storage unit 2 upon complete processing.

FIG. 11 is a diagram showing the structure of the diagnosis item progress file No. 2 generated during the generation of guide items.

The diagnosis item progress file No. 2 (2042) is configured with a plurality of records 2942a. Each record includes five data items 2042b1 to 2042b5, i.e. "diagnosis item", "part of speech", "score", "rank" and "high rank keyword".

Consider the record 2042a of the diagnosis item progress file No. 2 (2042) in FIG. 11, for example. In the next stage of progress, "select" is extracted as "diagnosis item", "verb" as "part of speech", "5" as "score", "1" as "rank" and "nil" as "high rank keyword". Also, "page setting" is extracted as "diagnosis item", "noun" as "part of speech", "1" as "score", "2" as "rank"and "select" as "high rank keyword".

This diagnosis item progress file No. 2 (2042) is a temporary file generated in the storage unit 2 by the diagnosis item generating unit 111, and upon complete processing, is deleted from the storage unit 2.

FIG. 12 is a diagram showing the structure of the diagnosis item file 205.

The diagnosis item file 205 is configured with a plurality of records 205a each including four data items 205b1 to 205b4, i.e. "rank", "diagnosis item", "high rank keyword" and "score". This diagnosis item file 205 is generated upon generation of a diagnosis item in the diagnosis item generating unit 111.

FIG. 13 is a diagram showing the structure of the navigation message generation condition file 206.

The navigation message generation condition file 206 is configured with a plurality of records 206a. Each record includes three data items 206b1 to 206b3, i.e. "selected diagnosis item", "keyword used" and "navigation message generation method". This navigation message generation condition file 206 is basically the data prepared in advance but may be changed or supplemented by the manager of the information retrieval system 100.

FIG. 14 is a diagram showing the structure of the navigation message file 207.

The navigation message file 207 includes one record 207a. This record 207a is configured with two data items 207b1 and 207b2 including "keyword used" and "navigation message". This navigation message file 207 is generated at the time of generating the navigation message in the navigation message generating unit 112.

Figure 15:
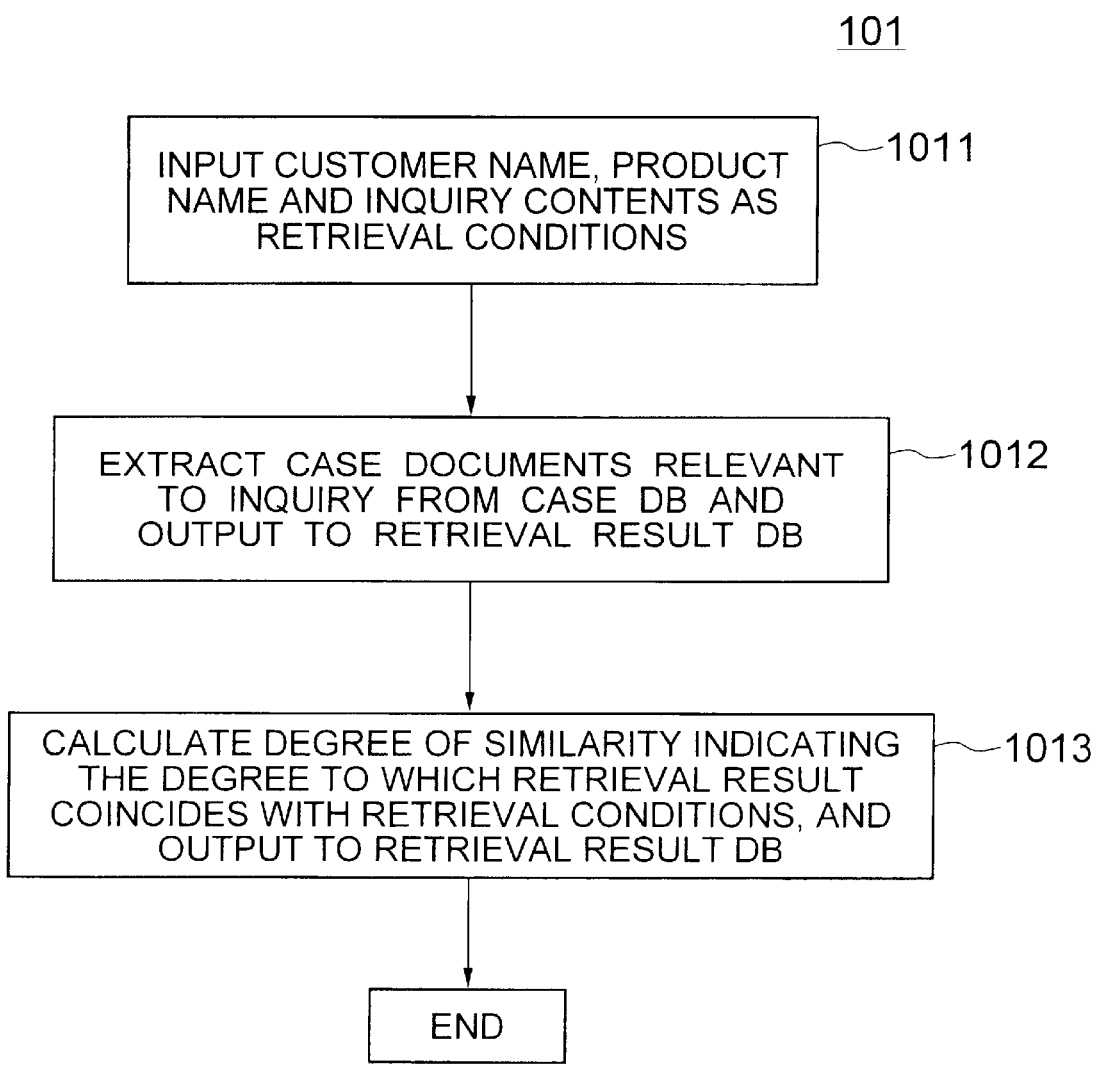
FIG. 15 is a flowchart showing the operation of a retrieval processing unit.

FIG. 15 is a flowchart showing the processing in the retrieval processing unit 101.

First, the customer name, the product name and the contents of the inquiry input by the operator on the input screen of FIG. 3 through the input unit 3 are input as a retrieval condition (step 1011).

Then, a case meeting the retrieval condition is extracted from the case data base 201 using the well-known full text retrieval method or the well-known similarity-based retrieval method, and the result thereof is output to the records 202b1 to 202b9 of the file 202a of the retrieval result data base 202 (step 1012).

As the next step, based on a well-known calculation method, the degree of similarity is calculated for each case retrieved, and output to the record "degree of similarity" in the file 202a of the retrieval result data base 202 (step 1013).

Figure 16:
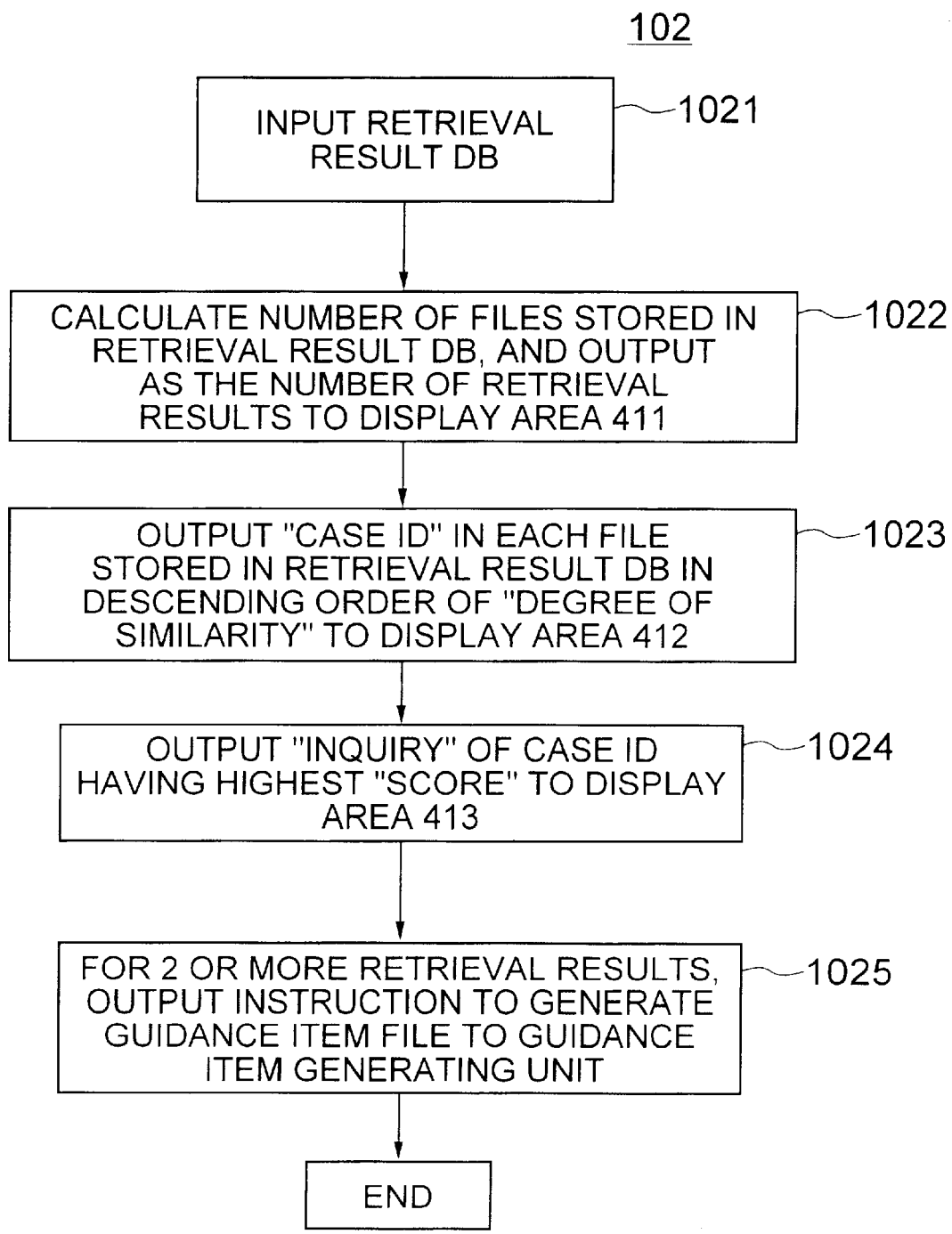
FIG. 16 is a flowchart showing the operation of a retrieval result display unit.

FIG. 16 is a flowchart showing the processing in the retrieval display unit 102.

First, the retrieval result data base 202 is input (step 1021).

Then, the number of the files 202a stored in the retrieval result data base 202 is calculated and output as the number of retrieval result cases to the display area 411 of the output unit 4 (step 1022).

As the next step, the records of "case ID" in the files 202a stored in the retrieval result data base 202 are output in the descending order of the value of "degree of similarity" on the display area 412 of the output unit 4 (step 1023).

Then, the record "inquiry" of the file 202ahaving the largest value of "degree of similarity" is output on the display area 413 of the output unit 4 (step 1024).

As the last step, as far as the number of the retrieval result cases is two or more, an instruction is given to the diagnosis item generating unit 111 to generate a diagnosis item (step 1025).

Figure 17:
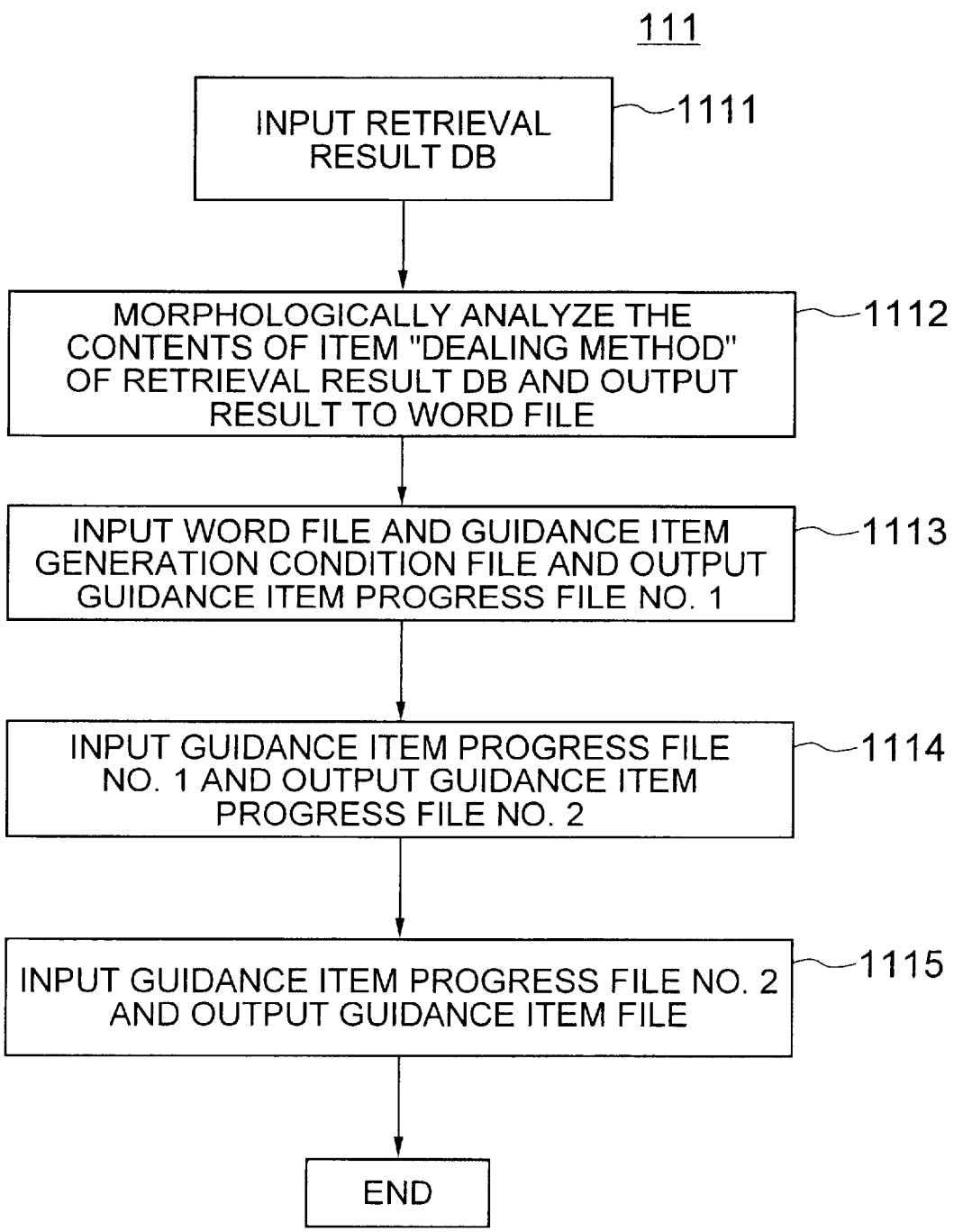
FIG. 17 is a flowchart showing the operation of a diagnosis item generating unit.

FIG. 17 is a flowchart showing the processing of the diagnosis item generating unit 111.

First, the retrieval result data base 202 is input (step 1111).

Then, the contents of the record "dealing method" in each file 202a of the retrieval result data base 202 are subjected to the well-known morphological analysis, a word is extracted for each part of speech, and the result is output to each of the data items 203b1 to 203b4 of each record 203a in the word file 203 (step 1112). The words for the same case are output in the order of appearance.

The word file 203 and the diagnosis item generation condition file 204 are input, and the data are output to the data items 2041b1 to 2041b6 of the record 2041a in the diagnosis item progress file No. 1 (2041) in the following way (step 1113).

First, by referring to the record 204a in the diagnosis item generation condition file 204, it is found that "first rank" is "verb". Then, the record 203a of the word file 203 is referred to. In the record 203a of the word file 203 shown in FIG. 8, for example, "select"can be extracted as "verb" first of all in "case ID" of "00203". Therefore, "00203" is output as "case ID", "select" as "diagnosis item", "verb" as "part of speech", the initial value "1" as "score" and "1" as "rank" of as data item 2041b of the record 2041a in the diagnosis item progress file No. 1 (2041). Then, in view of the fact that "select" can be extracted as "verb" as in the preceding case, "00203" is output as "case ID", "select"as "diagnosis item-""verb" as part of speech", the initial value "1" as "score" and "1" as "rank" of the data item 2041b1 of the record 2041a in the diagnosis item progress file No. 1 (2041). In the case where a plurality of "verbs" can be extracted from the same case, "score" of "verb" newly extracted is set to the initial value "1", and "1" is added to the value of "score" of "verb" in "first rank" already extracted. Specifically, the "score" of the second "select" extracted is "1", and "score" of the first "select" extracted is "2". Further, in view of the fact that "print" can be extracted as "verb", "00203" is output as "case ID", "print" as "diagnosis item", "verb" as "part of speech", the initial value "1" as "score" and "1" as "rank" of the data items 2041b1 of the record 2041a in the diagnosis item progress file No. 1 (2041). Then, "score" of the second "select"extracted is "2" and "score" of the first "select"extracted is "3".

Then, by referring to the record 204a in the diagnosis item generation condition file 204, it is found that "second rank" is "noun", and "extracted data condition" is "name involved", "particle" and "first rank verb". References to the record 203a of the word file 203 shows that as far as "case ID" is "00203", "noun" of "page setting" appears with the "particle" of "○" and the "first rank verb" of "select". Since "extracted data condition" is satisfied, "00203" is output as "case ID", "page setting" as "diagnosis item", "noun" as "part of speech", the initial value "1" as "score", "2" as "rank" d and "select" as "high rank keyword" in the data item 2041bof the record 2041a in the diagnosis item progress file No. 1 (2041).

By continuing the subsequent processing in similar manner, the diagnosis item progress file No. 1 (2041) is completed.

Returning to FIG. 17, the diagnosis item progress file No. 1 (2041) is input, followed by the data being output to each of the data items 2042b1 to 2042b5 of the record 2042a in the diagnosis item progress file No. 2 (2042) in the following-described manner (step 1114).

First, in the case where there is any plural "case IDs" in which "diagnosis item", "part of speech", "rank" and "high rank keyword" are the same in the record 2041a of the diagnosis item progress file No. 1 (2041), the "scores" thereof are totalized and the "diagnosis item", "part of speech", "total score", "rank", and "high rank keyword" are output to the data items 2042b1 to 2042b5 of the record 2042a in the diagnosis item progress file No. 2 (2042). In the record 2041a of the diagnosis item progress file No. 1 (2041) of FIG. 10, for example, there are two "case IDs" each including "diagnosis item"of "select", "part of speech" of "verb", "rank" of "1"and "high rank keyword" of "nil". Therefore, "score" of "5" (="3" +"2") and "high rank keyword" of "nil" are output to the record 2042a in the diagnosis item progress file No. 2 2042. As far as "diagnosis item", "part of speech", "rank" and "high rank keyword" are the same for any different case IDs, the total of "scores" is calculated and output by a similar procedure.

Then, returning to FIG. 17, the diagnosis item progress file No. 2 (2042) is input, and the data are output to each of the data items 205b1 to 205b4 of the record 205a in the diagnosis item file 205 in the following manner (step 1115).

First, "diagnosis item" involving "rank" of "1", i.e. "verb" is extracted in the diagnosis item progress file No. 2 (2042) and output in the descending order of "score". Then, "diagnosis item" involving "rank" of "1", i.e. "diagnosis item" involving "rank" of "2" having "verb" as "high rank keyword" is extracted and inserted immediately after "diagnosis item" involving "rank" of "1" while at the same time being output in the descending order of "score". After that, "diagnosis item" involving "rank" of "3" having "diagnosis item"involving "rank" of "2" as "high rank keyword" is extracted and inserted immediately after "diagnosis item-"involving "rank" of "2" while at the same time being output in the descending order of "score". In similar fashion, "diagnosis item" of the following "rank" is extracted and output.

Figure 18:
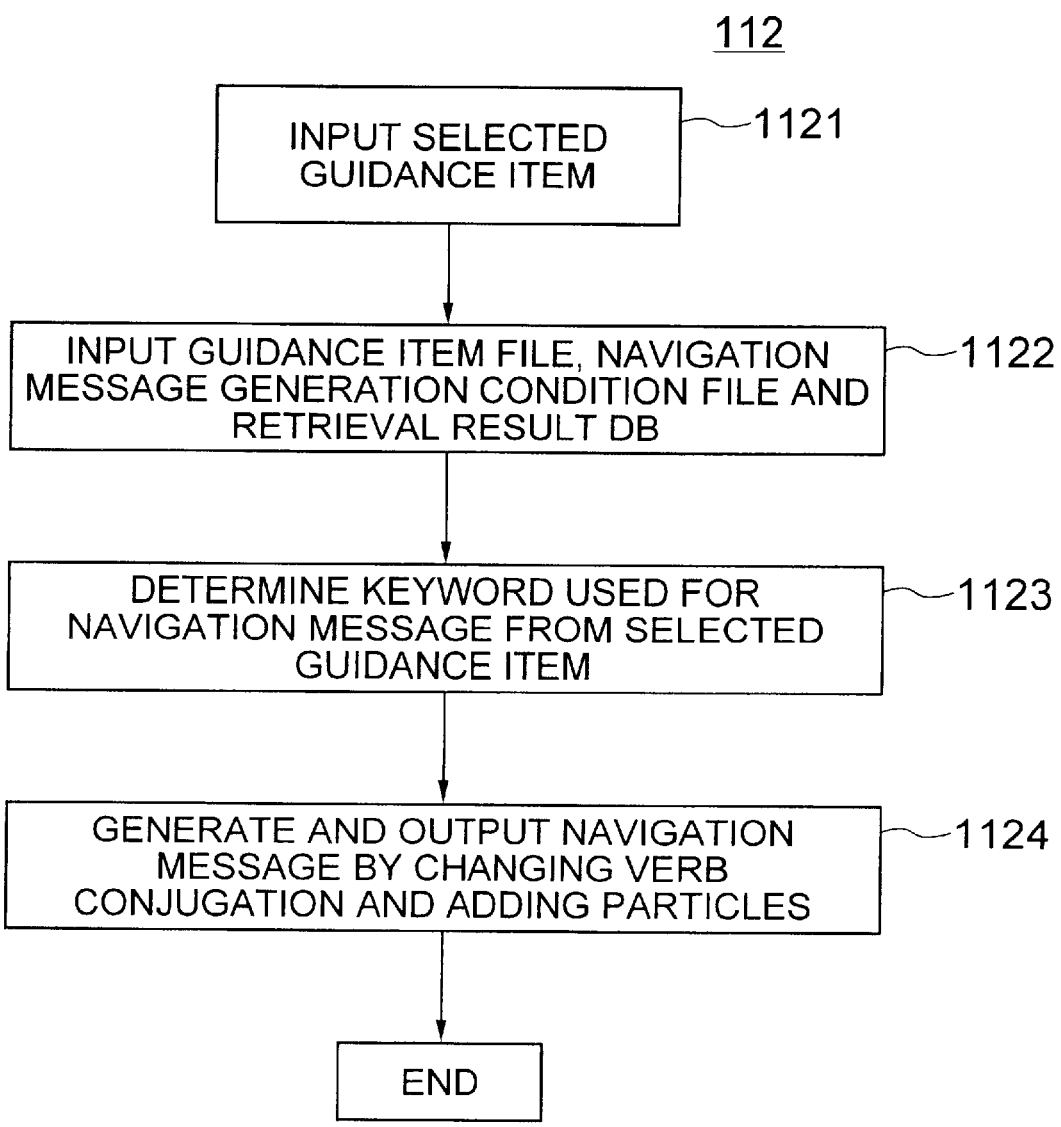
FIG. 18 is a flowchart showing the operation of a navigation message generating unit.

FIG. 18 is a flowchart showing the processing of the navigation message generating unit 112.

First, each diagnosis item of the diagnosis item file 205 is displayed in the area 414 of the output screen of FIG. 4 in a hierarchical structure, and the diagnosis item selected by the operator using the hierarchical structure is input (step 1121).

Then, the diagnosis item file 205, the navigation message generation condition file 206 and the retrieval result data base 202 are input (step 1122).

By referring to the navigation message generation condition file 206, a keyword used for the navigation message is determined in the following manner (step 1123).

First, "selected diagnosis item" of the record 206a in the navigation message generation condition file 206 is searched for the rank of the particular selected diagnosis item, and the keyword used for the navigation message is obtained from the rank registered in the corresponding "keyword used". In the case where the rank of the selected diagnosis item is "first rank" alone, for example, "keyword used" is "first rank", and therefore the diagnosis item of the first rank is determined as the keyword to be used in the navigation message. In the case where the rank of the selected diagnosis item is "third rank", on the other hand, "keyword used" is the diagnosis items of "first rank", "second rank" and "third rank", and therefore the diagnosis items of the first, second and third ranks are determined as the keywords to be used in the navigation message.

Then, by referring to the keyword used in the navigation message as determined as above and "navigation message generation method" of the record 206a in the navigation message generation condition file 206, the navigation message is generated in the following manner and output to the navigation message file 207 (step 1124). In the process, the conjugation of the verb is changed or the required particle is added by reference to the word file 203. In the case where the addition of a particle is required, the particle that has appeared together with the related "verb" and "noun" is extracted and utilized by reference to the word file 203.

In the case where the keyword to be used in the navigation message determined is "check, page setting" of the first and second ranks, for example, these keywords are output to "keyword used" in the navigation message file 207.

Then, the keywords used in the navigation message thus determined are applied to "<noun>"<particle><verb>" of "navigation message generation method" in the navigation message file 207, and "<(page setting)><(check)>("check page setting") of the navigation message is generated and output to "navigation message" in the navigation message file 207.

In place of step 1124 described above, a case including a combination of keywords used in the navigation message determined may be extracted from the case data base 201 and output to the navigation message 207 as a navigation message.

Figure 19:
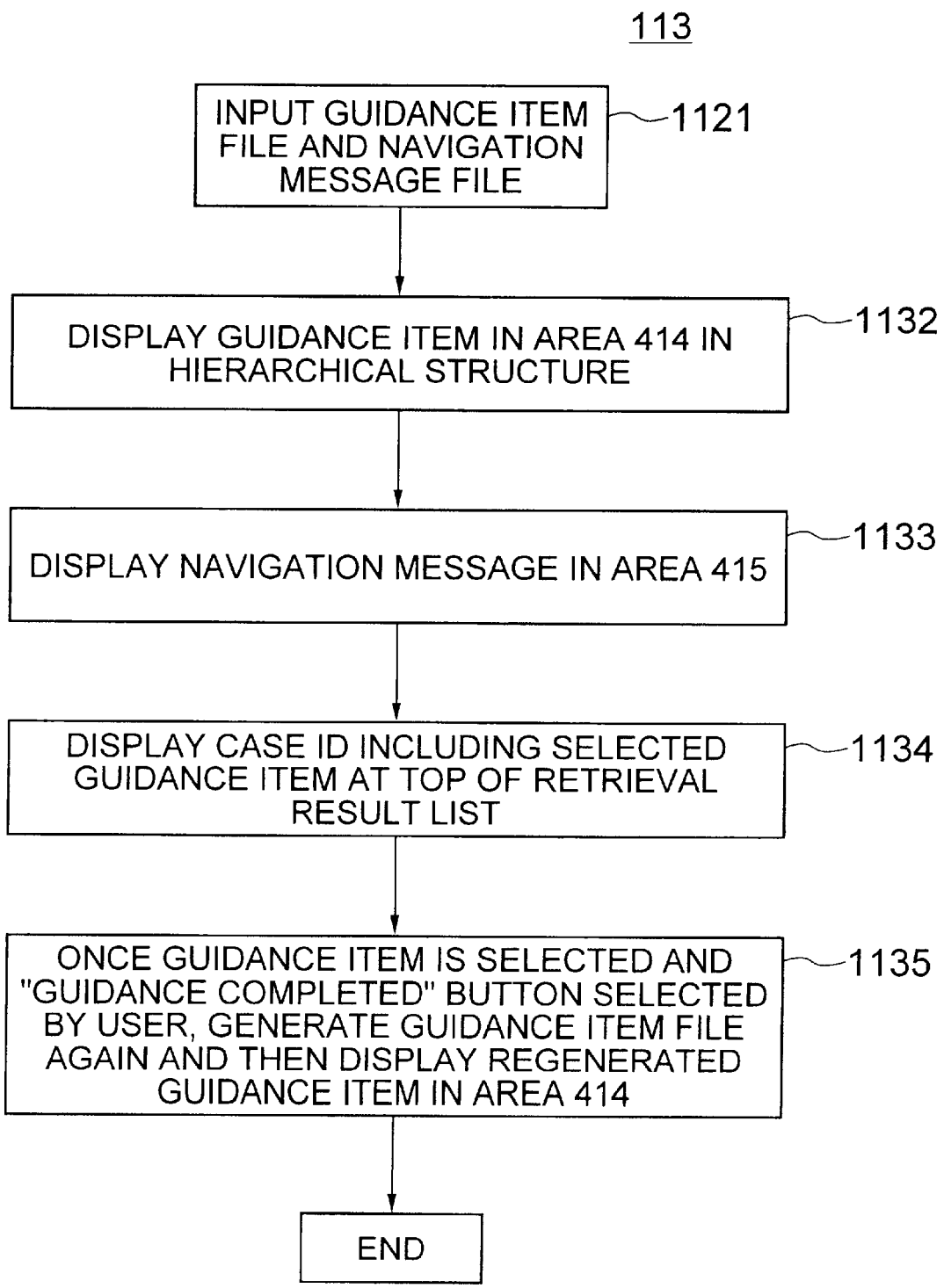
FIG. 19 is a flowchart showing the operation of a navigation display unit.

FIG. 19 is a flowchart showing the processing of the navigation display unit 113.

First, the diagnosis item file 205 and the navigation message file 207 are input (step 1131).

Then, each diagnosis item of the diagnosis item file 205 is displayed in the area 414 of the output screen shown in FIG. 4 as a hierarchical structure (step 1132).

In the case where the operator has selected one or more diagnosis items, a navigation message generated from the selected diagnosis items is displayed in the area 415 (step 1133). A plurality of navigation messages, if generated, are displayed in juxtaposition in the area 415.

By referring to the word file 203, a case ID including the diagnosis items selected by the operator is extracted, and displayed at the top of the area 412 in the retrieval result list (step 1134). The example screen shown in FIG. 20 represents the case where the diagnosis item of "page setting" lower in rank than "select" has been selected and the case ID including the selected diagnosis items is displayed at the top of the area 412.

Assume that the "diagnosis completed" button 418 has been selected by the operator having selected diagnosis items. The diagnosis item file 205 from which the selected diagnosis items are deleted is generated again and by referring to the diagnosis item file 205 thus generated again, the diagnosis items are displayed in the area 414 in hierarchical structure (step 1135).

The repeated generation process of the diagnosis item file 205 is similar to the operation of the diagnosis item generation processing unit 111. Specifically, a selected diagnosis item is deleted from the diagnosis item progress file No. 1 (2041) and the score of the deleted diagnosis item is added to the score of the other diagnosis items of the same case ID. Assume, for example, that the diagnosis item "select" is deleted in FIG. 10. The sum "5" of the scores "3" and "2" of "select" is added to the scores of the other diagnosis items such as "print" and "page setting". After that, the diagnosis item file 205 is generated again in a similar manner.

In the case where the selected diagnosis item is accompanied by a diagnosis item of lower rank, all the ranks including the particular diagnosis items are displayed at the top of the area 414 without deleting the diagnosis items.

Suppose that the diagnosis item "page setting"lower in rank than "select" is selected and the button "diagnosis completed" is depressed in FIG. 20, for example. The diagnosis item "page setting" lower in rank than "select" is deleted from the area 414.

According to another embodiment, the retrieval operation is performed by the customer instead of by the operator.

According to still another embodiment, an electronic manual attached to the product is searched by the customer or the operator. In such a case, the diagnosis items and the navigation messages are generated on the assumption that the contents of the electronic manual correspond to the contents of the inquiry and the text corresponds to the trouble-shooting method.

According to yet another embodiment, the score of a diagnosis item is calculated based on both the frequency and order of appearance of the particular diagnosis item or based on the order of appearance of the diagnosis item.

According to a further embodiment, a case including a combination of selected diagnosis items is extracted from the case data base 201, and the navigation message for the extracted case is output to the navigation message file 207.

The program for executing the information retrieval navigation method according to the invention described above can be stored in a computer readable storage medium and executed by being loaded in a memory.

The information retrieval navigation method according to the present invention permits any operator or customer not equipped with a sufficient knowledge about a given product to obtain a sufficient retrieval result.

What claim is:

1. An information retrieval navigation method using a processing unit, comprising the steps of:

extracting a retrieval navigation item among a plurality of retrieval navigation items which meets a retrieval navigation item generation condition in information on a multiplicity of cases to be searched, the retrieval navigation item generation condition including definitions of parts of speech including either a noun or a verb, hierarchical rank of the parts of speech, appearance order of the retrieved navigation items registered and the retrieved navigation items of high rank;

generating a message including said retrieval navigation item extracted based on the retrieval navigation item generation condition; and outputting the retrieval navigation item together with the message generated.

2. An information retrieval navigation method using a processing unit, comprising the steps of:

extracting a retrieval navigation item among a plurality retrieval navigation items which meet a retrieval navigation item generation condition in information on a multiplicity of cases to be searched, the retrieval navigation item generation condition including definitions of parts of speech including either a noun or a verb, hierarchical rank of the parts of speech, appearance order of the retrieved navigation items registered and retrieved navigation items of high rank; and selecting at least one retrieval navigation item from the retrieval navigation items thus generated;

generating a message including said retrieval navigation item extracted based on a retrieval navigation message generation condition including a rank of said extracted retrieval navigation item, said extracted retrieval navigation item, and an order of retrieval navigation items of said message not extracted in said extracting step; and outputting said generated message.

3. An information retrieval navigation method using a processing unit, comprising the steps of:

extracting a retrieval navigation item among a plurality of retrieval navigation items which meet a retrieval navigation item generation condition in information on a multiplicity of cases, the retrieval navigation item generation condition including definitions of parts of speech including either a noun or a verb, hierarchical rank of the parts of speech, appearance order of the retrieved navigation items registered and the retrieved navigation items of high rank;

selecting at least one retrieval navigation item from the retrieval navigation items thus generated;

generating a retrieval navigation message constituting a natural language message from combination of said selected retrieval navigation item with other retrieval navigation item in accordance with a retrieval navigation message generation condition including a rank of said extracted retrieval navigation item, said extracted retrieval navigation item, and an order of retrieval navigation items of said message not extracted in said extracting step;

extracting a case including said retrieval navigation item selected among said cases; and outputting said generated retrieval navigation message and a number of cases extracted.

4. An information retrieval navigation method according to claim 3, wherein said retrieval navigation message generation condition defines the rank of the selected retrieval navigation item, the rank of the corresponding keyword used and the pattern of the natural language message expressed using the part of speech for said keyword.

5. An information retrieval navigation method according to claim 1, wherein said retrieval navigation items are displayed in hierarchical structure.

6. An information retrieval navigation method according to claim 1, wherein said retrieval navigation items are weighted using the frequency of appearance and/or the order of appearance thereof, and said retrieval navigation items are displayed based on said weight.

7. An information retrieval navigation method according to claim 1, wherein a retrieval navigation item designated or a retrieval navigation item related to a designated retrieval navigation message is deleted based on an instruction to delete said retrieval navigation item or said retrieval navigation message.

8. An information retrieval navigation method according to claim 6, wherein a retrieval navigation item designated or a retrieval navigation item related to a designated retrieval navigation message is deleted based on an instruction to delete said retrieval navigation item or said retrieval navigation message, as the case may be, and the weight of the other retrieval navigation items of the case related to said deleted retrieval navigation item is increased.

9. A computer readable storage medium for storing a program used to execute an information retrieval navigation method, said method comprising the steps of:

extracting a retrieval navigation item among a plurality retrieval navigation items which meet a retrieval navigation item generation condition in information on a multiplicity of cases to be searched, the retrieval navigation item generation condition including definitions of parts of speech including either a noun or a verb, hierarchical rank of the parts of speech, appearance order of the retrieved navigation items registered and the retrieved navigation items of high rank;

selecting at least one retrieval navigation item from the retrieval navigation items thus generated;

generating a message including said retrieval navigation item extracted based on a retrieval navigation message generation condition including a rank of said extracted retrieval navigation item, said extracted retrieval navigation item, and an order of retrieval navigation items of said message not extracted in said extracting step;

extracting a case including said retrieval navigation item selected among said cases; and outputting said generated message.

10. An information retrieval system comprising:

information accumulation means for accumulating information on a plurality of cases to be searched, a retrieval navigation item generation condition including definitions of parts of speech including either a noun or a verb hierarchical rank of the parts of speech, appearance order of the retrieved navigation items registered and the retrieved navigation items of high rank;

retrieval means for searching the information accumulated in said information accumulation means and retrieving the information based on the parts of speech and the extraction conditions;

means for generating a message including said retrieval navigation item extracted based on the retrieval navigation item generation condition; and means for generating retrieval navigation items in accordance with the retrieval navigation item generation condition from the information accumulated in said information accumulation means.

11. An information retrieval system comprising:

information accumulation means for accumulating information on a plurality of cases to be searched, a retrieval navigation item generation condition including definitions of parts of speech including either a noun or a verbs hierarchical rank of the parts of speech, appearance order of the retrieved navigation items registered and the retrieved navigation items of high rank;

retrieval means for searching the information accumulated in said information accumulation means and retrieving part of the information;

means for extracting a retrieval navigation item among retrieval navigation items which meet a retrieval navigation item generation condition in information accumulated in said information accumulation means;

means for selecting at least one of said retrieval navigation items generated based on the parts of speech and the extraction conditions;

means for generating a message including said retrieval navigation item extracted based on a retrieval navigation message generation condition including a rank of said extracted retrieval navigation item, said extracted retrieval navigation item, and an order of retrieval navigation items of said message not extracted in said extracting step; and means for generating a retrieval navigation message as a natural language message in accordance with the retrieval navigation message generation condition from said selected retrieval navigation item.

12. An information retrieval navigation method according to claim 1, further comprising the steps of:

inputting inquiry contents from an operator; and executing retrieval of cases thereby to generate said retrieval navigation items based on said inquiry contents.

13. An information retrieval navigation method according to claim 12, wherein said cases include inquiry contents from an operator, causes related to said inquiry contents, and dealing method for said causes, wherein said step of executing retrieval includes a step for generating said retrieval navigation items from said dealing method in accordance with said retrieval navigation item generation condition.

* * * * *